US012647213B2

(12) United States Patent
Zhou et al.

(10) Patent No.: US 12,647,213 B2
(45) Date of Patent: Jun. 2, 2026

(54) RETRANSMISSION RESPONSE FEEDBACK METHOD AND APPARATUS, AND TERMINAL DEVICE

(71) Applicant: BEIJING UNISOC COMMUNICATIONS TECHNOLOGY CO., LTD., Beijing (CN)

(72) Inventors: Huan Zhou, Shanghai (CN); Xin Gui, Shanghai (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 300 days.

(21) Appl. No.: 18/284,605

(22) PCT Filed: Apr. 2, 2022

(86) PCT No.: PCT/CN2022/084974
§ 371 (c)(1),
(2) Date: Sep. 28, 2023

(87) PCT Pub. No.: WO2022/213913
PCT Pub. Date: Oct. 13, 2022

(65) Prior Publication Data
US 2024/0163018 A1      May 16, 2024

(30) Foreign Application Priority Data

Apr. 6, 2021      (CN) ......................... 202110369457.X

(51) Int. Cl.
H04L 1/18          (2023.01)
H04L 1/1812       (2023.01)
(Continued)

(52) U.S. Cl.
CPC .......... H04L 1/1812 (2013.01); H04L 5/0053 (2013.01); H04W 72/11 (2023.01); H04W 72/1273 (2013.01)

(58) Field of Classification Search
CPC ..... H04W 72/11; H04W 72/1273; H04L 1/16; H04L 1/1607; H04L 1/18; H04L 1/1812;
(Continued)

(56) References Cited

U.S. PATENT DOCUMENTS

| | | | |
|---|---|---|---|
| 2020/0295882 A1 | 9/2020 | Wang et al. | |
| 2022/0078832 A1* | 3/2022 | Elshafie | ............... H04W 72/21 |
| 2022/0103307 A1* | 3/2022 | Yang | ..................... H04W 72/23 |

FOREIGN PATENT DOCUMENTS

| | | |
|---|---|---|
| CN | 110034902 A | 7/2019 |
| CN | 110311762 A | 10/2019 |

(Continued)

OTHER PUBLICATIONS

CNIPA First Office Action for corresponding CN Application No. 202110369457.X; Issued Mar. 12, 2024; 25 pages.
(Continued)

*Primary Examiner* — Phuc H Tran
(74) *Attorney, Agent, or Firm* — CANTOR COLBURN LLP

(57) ABSTRACT

A retransmission response feedback method and apparatus are provided. The method includes: traversing serving cells to determine HARQ-ACK of an original downlink slot and a delayed downlink slot in each serving cell for which an uplink channel resource requires feedback, wherein the original downlink slot refers to a downlink slot corresponding to an ACK/NACK feedback determined based on a slot offset K1 from a PDSCH to the ACK/NACK feedback, and the delayed downlink slot refers to a downlink slot in which the ACK/NACK feedback determined based on the slot
(Continued)

a terminal device traverses serving cells to determine HARQ-ACK of an original downlink slot and a delayed downlink slot in each serving cell for which an uplink channel resource requires feedback — 401 the terminal device acquires HARQ-ACK information of the original downlink slot and HARQ-ACK information of the delayed downlink slot, respectively — 402 the terminal device generates a HARQ-ACK codebook based on the HARQ-ACK information of the original downlink slot and the HARQ-ACK information of the delayed downlink slot — 403 the terminal device transmits the HARQ-ACK codebook using an uplink channel — 404 offset K1 is transmitted with a delay; acquiring HARQ-ACK information of the original downlink slot and HARQ-ACK information of the delayed downlink slot, respectively; generating a HARQ-ACK codebook based on the HARQ-ACK information of the original downlink slot and the HARQ-ACK information of the delayed downlink slot; and transmitting the HARQ-ACK codebook using an uplink channel.

17 Claims, 7 Drawing Sheets

(51) Int. Cl.
    *H04L 5/00*         (2006.01)
    *H04W 72/11*      (2023.01)
    *H04W 72/1273*    (2023.01)

(58) Field of Classification Search
    CPC ... H04L 1/1854; H04L 1/1861; H04L 5/0023; H04L 5/0044; H04L 5/0053; H04L 5/0055
    See application file for complete search history.

(56) References Cited

FOREIGN PATENT DOCUMENTS

| | | | |
|---|---|---|---|
| CN | 110351018 A | 10/2019 | |
| CN | 110557231 A | 12/2019 | |
| CN | 111431681 A | 7/2020 | |
| WO | 2019216620 A1 | 11/2019 | |
| WO | 2020197195 A1 | 10/2020 | |
| WO | WO-2023055048 A1 * | 4/2023 | ........... H04L 1/0031 |
| WO | WO-2024208170 A1 * | 10/2024 | ........... H04L 5/0091 |

OTHER PUBLICATIONS

CATT "UE feedback enhancements for HARQ-ARK"; 3GPP TSG RAN WG1 #104-3; R1-2100376; e-Meeting, Jan. 25-Feb. 5, 2021.

International Search Report for International Application No. PCT/CN2022/084974; Date of Mailing, May 23, 2022.

EPO Partial Extended European Search Report for corresponding EP Application No. 22783979.2; Issued Oct. 1, 2024.

* cited by examiner

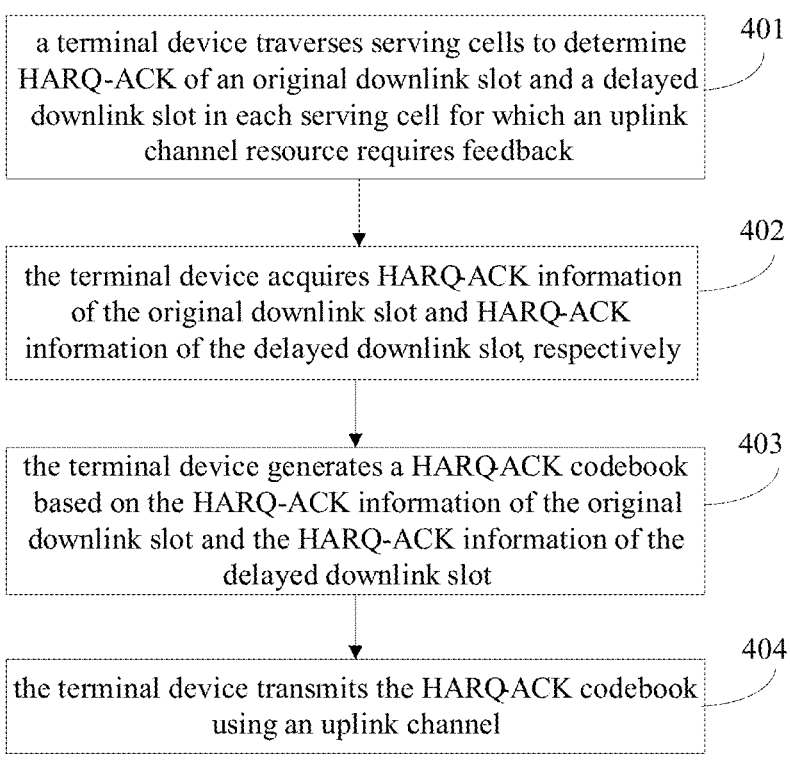

a terminal device traverses serving cells to determine HARQ-ACK of an original downlink slot and a delayed downlink slot in each serving cell for which an uplink channel resource requires feedback — 401 the terminal device acquires HARQ-ACK information of the original downlink slot and HARQ-ACK information of the delayed downlink slot, respectively — 402 the terminal device generates a HARQ-ACK codebook based on the HARQ-ACK information of the original downlink slot and the HARQ-ACK information of the delayed downlink slot — 403 the terminal device transmits the HARQ-ACK codebook using an uplink channel — 404

FIG. 4

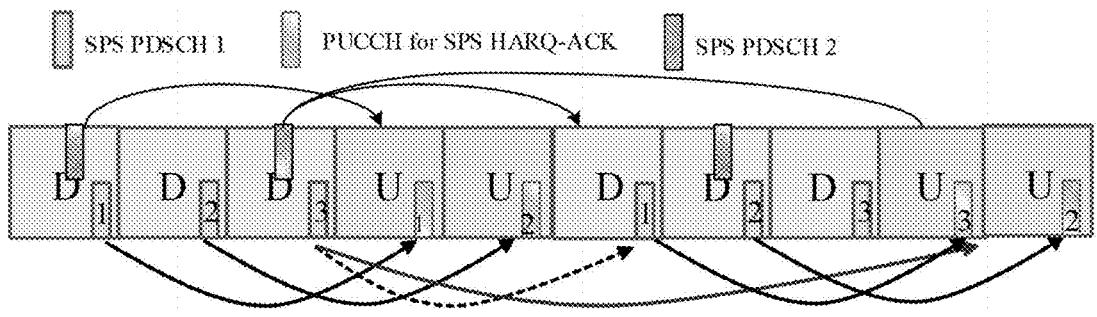

SPS PDSCH 1       PUCCH for SPS HARQ-ACK       SPS PDSCH 2

FIG. 5

11 original downlink slot
determining circuitry

12 delayed downlink slot
determining circuitry

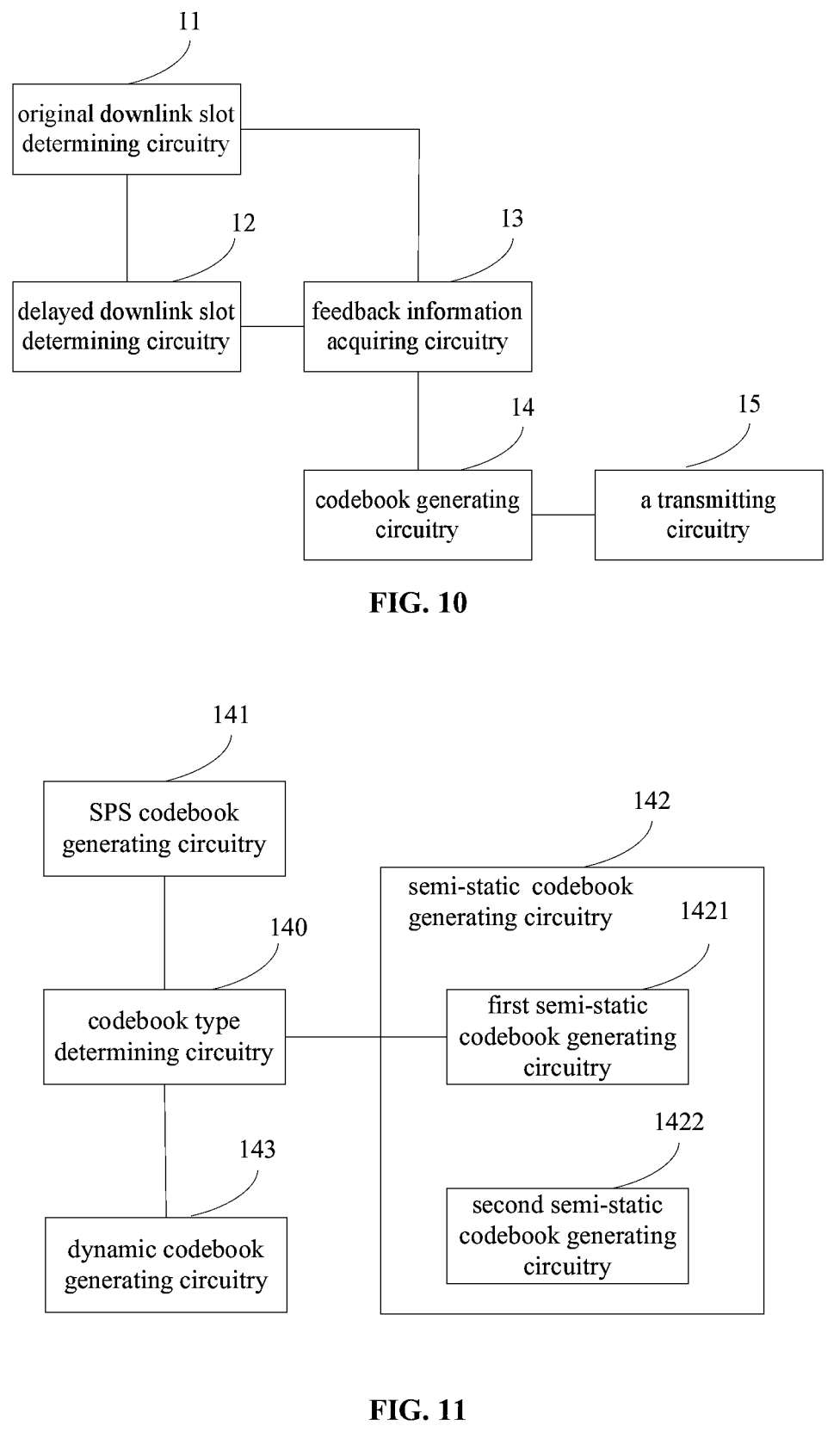

13 feedback information
acquiring circuitry

14 codebook generating
circuitry

15 a transmitting
circuitry

SPS codebook
generating circuitry

142 semi-static codebook
generating circuitry

140 codebook type
determining circuitry

1421 first semi-static
codebook generating
circuitry

1422 second semi-static
codebook generating
circuitry

143 dynamic codebook
generating circuitry

FIG. 11

RETRANSMISSION RESPONSE FEEDBACK METHOD AND APPARATUS, AND TERMINAL DEVICE

CROSS-REFERENCE TO RELATED APPLICATIONS

This is the U.S. national stage of application No. PCT/CN2022/084974, filed on Apr. 2, 2022. Priority under 35 U.S.C. § 119(a) and 35 U.S.C. § 365(b) is claimed from Chinese Application No. 202110369457.X, filed Apr. 6, 2021, the disclosure of which is also incorporated herein by reference.

TECHNICAL FIELD

The present disclosure generally relates to communication technology field, and more particularly, to a retransmission response feedback method and apparatus, and a terminal device.

BACKGROUND

In 5G New Radio (NR), downlink data scheduling time indication is illustrated in FIG. 1. K0 and K1 are in slot. K0 represents a time interval between a Physical Downlink Shared Channel (PDSCH) and a Physical Downlink Control Channel (PDCCH), where the PDSCH is used to transmit downlink data, and the PDCCH is used to transmit Downlink Control Information (DCI). K1 represents a time interval between a Hybrid Automatic Repeat reQuest (HARQ)-ACK feedback and the PDSCH. A resource unit of the PDCCH is CCE, and one PDCCH includes n consecutive CCEs.

To PUCCH resources used for feeding back dynamic scheduling PDSCH HARQ-ACK, gNB (generation NodeB, next generation base station) configures up to 4 HARQ-ACK bit ranges for a User Equipment (UE) and configures a PUCCH resource set that can be used to feed back dynamic PDSCH HARQ-ACK in each HARQ-ACK bit range. That is, there is a unique PUCCH resource set in each HARQ-ACK bit range, and each PUCCH resource set includes multiple PUCCH resources. Dynamic scheduling DCI may indicate PUCCH resource indication, and the UE determines which PUCCH resource in the PUCCH resource set is used to feed back dynamic scheduling PDSCH HARQ-ACK based on the indication (and an index of a PDCCH starting CCE carrying DCI).

NR adopts asynchronous HARQ in both uplink and downlink, and HARQ-ACK information can be carried on either PUCCH or PDCCH. NR R15 merely supports the UE to have one PUCCH carrying HARQ-ACK information in one slot. If the UE detects receiving PDSCH in slot n, or the UE detects DCI released by Semi-Persistent Scheduling (SPS) in slot n, the UE transmits the corresponding HARQ-ACK information in slot (n+k), where k is indicated by a PDSCH-to-HARQ timing indicator in the DCI. If there is no such timing indicator in the DCI, k is indicated by a high-layer parameter DI-DataToUL-ACK.

SUMMARY

Embodiments of the present disclosure provide a retransmission response feedback method and apparatus, and a terminal device, to ensure effective feedback of SPS PDSCH HARQ-ACK.

In an embodiment of the present disclosure, a retransmission response feedback method is provided, including: traversing serving cells to determine HARQ-ACK of an original downlink slot and a delayed downlink slot in each serving cell for which an uplink channel resource requires feedback, wherein the original downlink slot refers to a downlink slot corresponding to an ACK/NACK feedback determined based on a slot offset K1 from a PDSCH to the ACK/NACK feedback, and the delayed downlink slot refers to a downlink slot in which the ACK/NACK feedback determined based on the slot offset K1 is transmitted with a delay; acquiring HARQ-ACK information of the original downlink slot and HARQ-ACK information of the delayed downlink slot, respectively; generating a HARQ-ACK codebook based on the HARQ-ACK information of the original downlink slot and the HARQ-ACK information of the delayed downlink slot; and transmitting the HARQ-ACK codebook using an uplink channel.

In an embodiment of the present disclosure, a non-volatile or non-transitory computer-readable storage medium having computer instructions stored therein is provided, wherein when the computer instructions are executed by a processor, the above method is performed.

In an embodiment of the present disclosure, an electronic device including a memory and a processor is provided, wherein the memory has computer instructions stored therein, and when the processor executes the computer instructions, the above method is performed.

BRIEF DESCRIPTION OF THE DRAWINGS

FIG. 4 is a flow chart of a retransmission response feedback method according to an embodiment.

FIG. 5 is a schematic diagram of original downlink slots that need to feed back HARQ-ACK and corresponding delayed downlink slots in each slot of an uplink channel resource according to an embodiment.

FIG. 10 is a block diagram of a retransmission response feedback apparatus according to an embodiment.

FIG. 11 is a block diagram of a codebook generating circuitry according to an embodiment.

DETAILED DESCRIPTION

Figure 1:
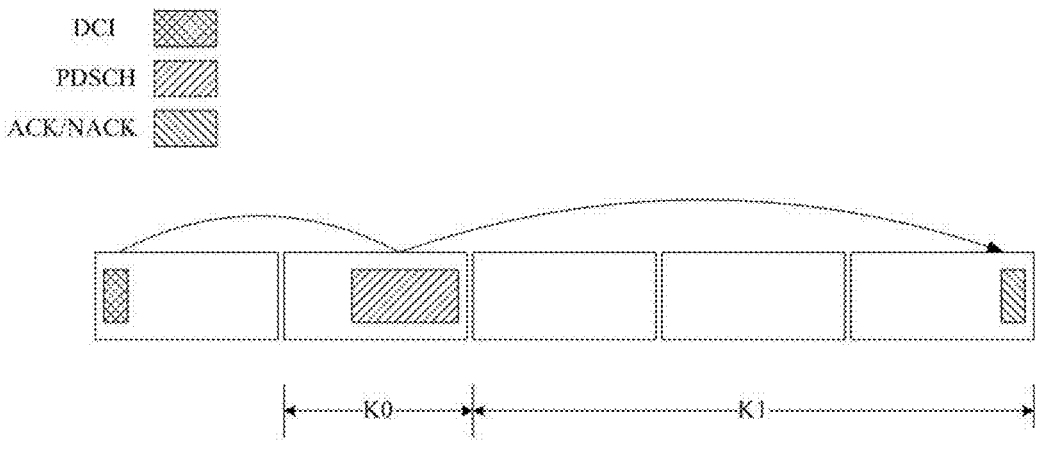
FIG. 1 is a schematic diagram of downlink data scheduling time in existing techniques.
Figure 2:
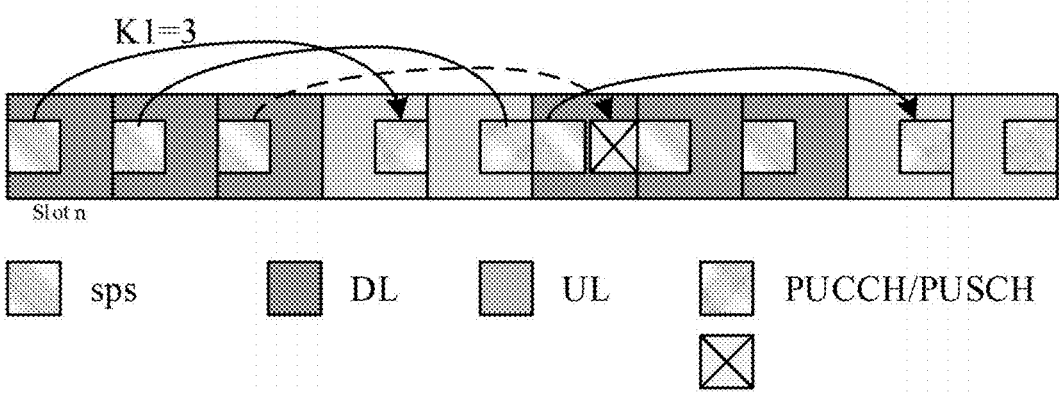
FIG. 2 is a schematic diagram of a relationship between HARQ-ACK feedback slots and uplink and downlink slots in SPS in the existing techniques.

In order to clarify the objects, characteristics and advantages of the disclosure, embodiments of present disclosure will be described in detail in conjunction with accompanying drawings.

HARQ is a technology that combines Forward Error Correction (FEC) and Automatic Repeat reQuest (ARQ) methods. FEC allows a receiver to correct some errors by adding redundant information, thereby reducing a number of retransmission times. For errors that cannot be corrected by FEC, the receiver may request a sender to retransmit data through ARQ. The receiver uses an error detection code, usually Cyclic Redundancy Check (CRC), to detect whether a received data packet has an error. If there is no error, the receiver may transmit a positive acknowledgment (ACK) to the sender. After receiving the ACK, the sender may transmit a next data packet. If an error occurs, the receiver may drop the data packet and transmit a negative acknowledgment (NACK) to the sender. After receiving the NACK, the sender may retransmit the same data packet. Entirety of HARQ-ACK information fed back by a UE on one HARQ feedback resource, i.e., PUSCH or PDSCH, is called a HARQ-ACK codebook.

Semi-Persistent Scheduling (SPS) in NR refers to semi-statically configuring a radio resource and periodically allocating the radio resource to a specific UE. A PDCCH scrambled using SPS Cell-Radio Network Temporary Identifier (C-RNTI) specifies the radio resource used by the UE (for ease of description, called SPS resource hereinafter). Every cycle, the UE uses the SPS resource to receive or transmit data. gNB does not need to re-deliver PDCCH in that slot to specify the allocated resource, thereby reducing corresponding PDCCH overhead.

Based on that there is only SPS PDSCH HARQ-ACK feedback without scheduling PDCCH, or without SPS PDSCH activating PDCCH, or without SPS PDSCH deactivating PDCCH HARQ-ACK feedback, an SPS PDSCH HARQ-ACK codebook is adopted. When multiple SPS PDSCHs are configured, the HARQ-ACK bit sequence is as follows. Depending upon the PUCCH in that slot or sub-slot needing to carry SPS PDSCH in which slots or sub-slots, a slot or sub-slot index set is determined, and slots or sub-slots in the set are traversed, HARQ-ACK information is arranged in an ascending order of downlink slots with {SPS configuration index, serving cell index}, then the HARQ-ACK information is arranged in an ascending order of the SPS configuration index in each serving cell index, and finally the HARQ-ACK information is arranged in an ascending order of the serving cell index.

Based on that SPS PDSCH HARQ-ACK and HARQ-ACK of a dynamical scheduling PDSCH are to be fed back together, it is determined to adopt a type 1 HARQ-ACK codebook or a type 2 HARQ-ACK codebook based on high-layer configuration information.

The type 1 HARQ-ACK codebook is a semi-static codebook. First, it is necessary to determine a set M of possible PDSCH positions. Factors that affect M include: a value range of K1, time domain resource allocation configuration, uplink and downlink Sub-Carrier Space (SCS) configuration, semi-static uplink and downlink frame structure configuration. If DCI format 1_1 is used to schedule PDSCH, a set of K1 is configured by high-layer signaling; if DCI format 1_0 is used to schedule PDSCH, the set of K1 is fixed to {1, 2, 3, 4, 5, 6, 7, 8}. K1 is a parameter of PUCCH, and its corresponding SCS is SCS of PUCCH. In the type 1 HARQ-ACK codebook, it is necessary to determine a set K1DL of K1 corresponding to downlink based on uplink and downlink SCS configuration. For a downlink slot corresponding to each K1DL set, first, a possible position of PDSCH without an uplink and downlink frame structure conflict is determined. position, and then a possible position of PDSCH without overlapping is determined. The semi-static codebook of NR R15 needs to feedback HARQ-ACK at these possible positions.

The type 2 HARQ-ACK codebook is a dynamic codebook which is determined based on a counting Downlink Assignment Index (DCI) and a total DAI. For a certain PUCCH, the total DAI is a total number of DCI sent by all base stations in a cell from a first DAI time point to a current DAI time point in a PDCCH listening time set. The counting DAI is a sum of a cumulative count of the number of DCIs transmitted by a base station from a first cell to a current cell at the current DAI time point and the total DAI corresponding to a previous DAI time point in the PDCCH listening time set.

Embodiments of the present disclosure propose corresponding solutions for the above three different codebooks to ensure effective feedback of SPS PDSCH HARQ-ACK.

Technical solutions of the embodiments of the present disclosure may be applied to various mobile communication systems, such as Global System of Mobile Communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunication System (UMTS), Worldwide Interoperability for Microwave Access (WiMAX) communication system, 5th Generation (5G) system, or NR system.

Figure 3:
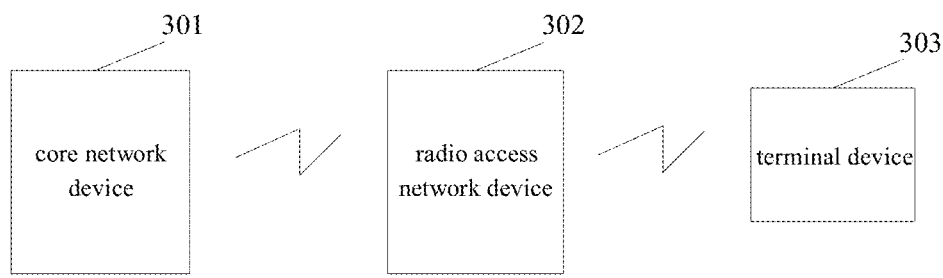
FIG. 3 is an architectural schematic diagram of a mobile communication system suitable for embodiments of the present disclosure.

An architecture of a mobile communication system applicable to the embodiments of the present disclosure is illustrated in FIG. 3. The mobile communication system may include a core network device 301, a radio access network device 302 and at least one terminal device 303. The terminal device 303 is connected to the radio access network device in a wireless way, and the radio access network device is connected to the core network device in a wireless or wired way. The core network device and the radio access network device may be independent and different physical devices or may be a same physical device integrated with functions of both the core network device and the radio access network device or may be one physical device integrated with partial functions of the core network device and partial functions of the radio access network device. The terminal device may be fixed or movable.

The terminal device 303 may be called terminal, UE, Mobile Station (MS), Mobile Terminal (MT), etc. The terminal device 303 may be a mobile phone, a tablet computer, a computer with radio transceiver functions, a Virtual Reality (VR) terminal device, an Augmented Reality (AR) terminal device, a wireless terminal in industrial control, a wireless terminal in driverless driving, a wireless terminal in remote surgery, a wireless terminal in smart grids, a wireless terminal in transportation security, a wireless terminal in smart cities, a wireless terminal in smart homes, etc. In the embodiments, the aforementioned terminal devices and chips applicable to the aforementioned terminal devices are collectively referred to as terminal device. It should be understood that the embodiments of the present disclosure do not limit specific technology and specific device form adopted by the terminal device.

The terminal device in the embodiments of the present disclosure may refer to a UE, an access terminal, a user unit, a user station, an MS, a remote station, a remote terminal, a mobile equipment, a user terminal, a terminal, a wireless communication equipment, a user agent or a user device. The terminal equipment may further be a cellular phone, a cordless phone, a Session Initiation Protocol (SIP) phone, a Wireless Local Loop (WLL) station, a Personal Digital Assistant (PDA), a handheld device with a wireless communication function, a computing device or other processing devices connected to a wireless modem, an in-vehicle device or a wearable device, which is not limited in the embodiments of the present disclosure.

In the mobile communication system, the radio access network device 302 is an access device through which the terminal device 303 wirelessly accesses the mobile communication system. The radio access network device 302 may be a base station, an evolved base station (evolved NodeB), a home base station, an Access Point (AP) in a WiFi system, a wireless relay node, a wireless backhaul node, a Transmission Point (TP) or a Transmission and Reception Point (TRP), or may be a gNB in an NR system, or may be a component or part of an equipment that constitutes the base station, such as Centralized Unit (CU), Distributed Unit (DU) or Baseband Unit (BBU). It should be understood that in the embodiments of the present disclosure, a specific technology and specific device form adopted by the radio access network device 302 are not limited. In the embodiments, the radio access network device is referred to as network device. Without special explanation, in the embodiments, the network device refers to the radio access network device. In the embodiments, the network device may refer to the network device itself or may be a chip used in the network device to complete a radio communication processing function.

In the embodiments of the present disclosure, the terminal device or network device includes a hardware layer, an operating system layer running on the hardware layer, and an application layer running on the operating system layer. This hardware layer includes hardware such as Central Processing Unit (CPU), Memory Management Unit (MMU) and memory. The operating system may be any one or more computer operating systems that implement business processing through processes, such as Linux operating system, Unix operating system, Android operating system, iOS operating system or windows operating system. The application layer includes applications such as browsers, address books, word processing software and instant messaging software. In addition, the embodiments of the present disclosure do not specifically limit a specific structure of an execution subject of the method provided in the embodiments of the present disclosure, as long as a program that records codes of the method provided in the embodiments of the present disclosure can be run to communicate according to the method. For example, the execution subject of the method provided in the embodiments of the present disclosure may be a terminal device or a network device, or a functional module in the terminal device or network device that can call a program and execute the program.

It should be noted that the uplink channel resource mentioned in the embodiments of the present disclosure refer to a configured SPS PDSCH HARQ-ACK PUCCH resource. In addition, a slot mentioned in the following embodiments may be replaced by sub-slot according to needs of different applications, which is not limited in the present disclosure.

The words "first", "second" and others involved in the embodiments of the present disclosure are only used for the purpose of differentiating description and should neither be understood as indicating or implying relative importance, nor be understood as indicating or implying an order. "equal to" involved in the embodiments of the present disclosure can be used in conjunction with "greater than", and are applicable to technical solutions used for "greater than", and can also be used in conjunction with "less than", and are applicable to technical solutions used for "less than". It should be noted that when "equal to" is used in conjunction with "greater than", it cannot be used with "less than" at the same time; and when "equal to" is used in conjunction with "less than", it cannot be used with "greater than".

With respect to issues on SPS PDSCH HARQ-ACK feedback in existing techniques, embodiments of the present disclosure provide a retransmission response feedback method and device. Serving cells are traversed to determine HARQ-ACK of an original downlink slot and a delayed downlink slot in each serving cell for which an uplink channel resource requires feedback, HARQ-ACK information of the original downlink slot and HARQ-ACK information of the delayed downlink slot are acquired, respectively, a HARQ-ACK codebook is generated based on the HARQ-ACK information of the original downlink slot and the HARQ-ACK information of the delayed downlink slot, and the HARQ-ACK codebook is transmitted using an uplink channel.

Referring to FIG. 4, FIG. 4 is a flow chart of a retransmission response feedback method according to an embodiment. The method includes 401 to 404.

In 401, a terminal device traverses serving cells to determine HARQ-ACK of an original downlink slot and a delayed downlink slot in each serving cell for which an uplink channel resource requires feedback.

In some embodiments, PDSCH configured in each serving cell may include SPS PDSCH and/or dynamical scheduling PDSCH.

PDSCH configured on the serving cell in FIG. 5 includes SPS PDSCH1 and SPS PDSCH2, K1=3. D represents a downlink channel resource, and U represents an uplink channel resource.

A dotted line with an arrow indicates a feedback slot Slot5 of HARQ-ACK of SPS PDSCH1 numbered 3 (denoted as SPS1-3). As slot Slot5 corresponds to the downlink channel resource, the HARQ-ACK feedback needs to be delayed to a slot of the subsequent PUCCH resource, where the specific slot to which it is delayed is not limited in the embodiments of the present disclosure and may be determined based on existing technologies. For example, the HARQ-ACK feedback may be delayed to a next available PUCCH resource slot Slot8.

In some embodiments, the original downlink slot refers to a downlink slot corresponding to an ACK/NACK feedback determined based on a slot offset K1 from a PDSCH to the ACK/NACK feedback, and the delayed downlink slot refers to a downlink slot in which the ACK/NACK feedback determined based on the slot offset K1 is transmitted with a delay.

By traversing the PDSCH configured in each serving cell, the HARQ-ACK of the original downlink slot and the delayed downlink slot in each serving cell for which the uplink channel resource requires feedback can be determined. For example, in FIG. 5, within the uplink channel resource Slot8, the HARQ-ACK of the original downlink slot that requires to be fed back is SPS1 PDSCH1 HARQ-ACK of Slot5, and the HARQ-ACK of the delayed downlink slot that requires to be fed back is SPS1 PDSCH1 HARQ-ACK of Slot3.

In 402, the terminal device acquires HARQ-ACK information of the original downlink slot and HARQ-ACK information of the delayed downlink slot, respectively.

In 403, the terminal device generates a HARQ-ACK codebook based on the HARQ-ACK information of the original downlink slot and the HARQ-ACK information of the delayed downlink slot.

For different codebooks, HARQ-ACKs that required to be fed back in each slot have different coding orders. Therefore, in the embodiments of the present disclosure, HARQ-ACK codebook generation methods for different codebooks are also provided as follows.

Based on that there is only SPS PDSCH HARQ-ACK feedback, the HARQ-ACK codebook is generated using the HARQ-ACK information of the original downlink slot and the HARQ-ACK information of the delayed downlink slot based on a bit order of SPS codebooks. That is, the HARQ-ACK information is arranged in an ascending order of downlink slots with {SPS configuration index, serving cell index}, then the HARQ-ACK information is arranged in an ascending order of the SPS configuration index in each serving cell index, and finally the HARQ-ACK information is arranged in an ascending order of the serving cell index, to generate an SPS PDSCH HARQ-ACK codebook.

Based on that there is HARQ-ACK feedback of dynamical scheduling PDSCH and/or HARQ-ACK feedback of PDCCH released by SPS PDSCH, and there is SPS PDSCH HARQ-ACK feedback, a type of the HARQ-ACK codebook is determined based on high-layer configuration information. Accordingly, a manner for generating the HARQ-ACK codebook is adopted based on the type.

In response to the type being a semi-static HARQ-ACK codebook, the semi-static HARQ-ACK may be generated by two optional methods.

The first method is generating the semi-static HARQ-ACK codebook by disposing the HARQ-ACK information of the delayed downlink slot behind the HARQ-ACK information of the original downlink slot.

The first method may be realized by following two ways.

The first way includes generating the semi-static HARQ-ACK codebook by disposing in sequence the HARQ-ACK information of the delayed downlink slot of each serving cell after the HARQ-ACK information of the original downlink slot of the serving cell.

The second way includes generating the semi-static HARQ-ACK codebook by disposing the HARQ-ACK information of the delayed downlink slot of all serving cells behind the HARQ-ACK information of the original downlink slot of all the serving cells.

Figure 6:
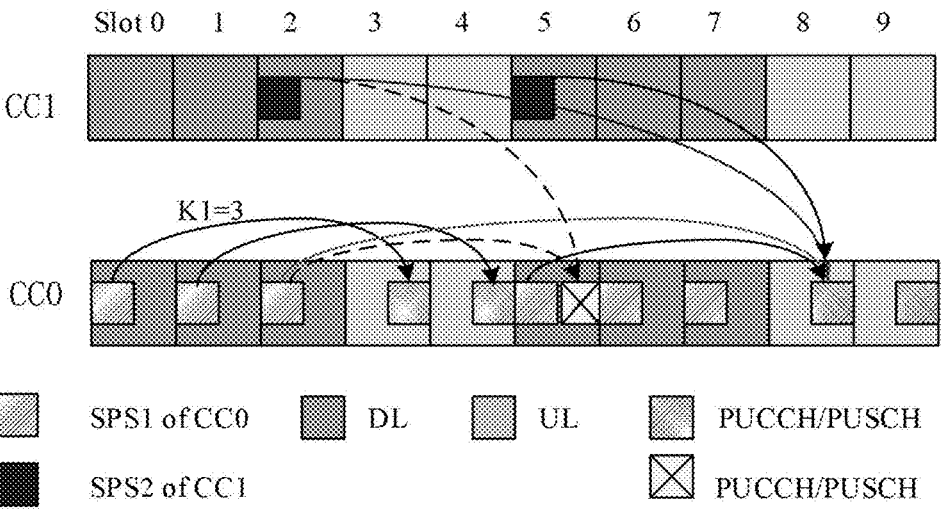
FIG. 6 is an example of SPS PDSCH configured on different serving cells and corresponding feedback of SPS PDSCH HARQ-ACK according to an embodiment.

The above two ways are further described in detail with reference to the PDSCH configured in the serving cell as shown in FIG. 6.

In this example, there are two carriers including CC0 and CC1, where merely CC0 transmits PUCCH, offset K1 of HARQ-ACK feedback of SPS1 and SPS2 is 3. A K1 slot set configured by high-layer parameters is {1, 2, 3}.

One SPS PDSCH is configured on the CC0 serving cell, which is SPS PDSCH1 (for ease of description, it is called SPS1 hereinafter), and has a cycle of one slot. SPS1 is configured to allow a delay.

The CC0 serving cell is also configured with 1 dynamical scheduling PDSCH which is located in a slot Slot6.

One SPS PDSCH is configured on the CC1 serving cell, which is SPS PDSCH2 (for ease of description, it is called SPS2 hereinafter), and has a cycle of 3 slots. SPS2 is configured not to allow a delay.

A transmission situation of SPS PDSCH and HARQ-ACK information corresponding to the SPS PDSCH in each slot is shown in Table 1, where ACK is represented by 1, and NACK is represented by 0.

TABLE 1

| Slot index | Slot 0 | 1 | 2 | 3 | 4 | 5 | 6 | 7 |
|---|---|---|---|---|---|---|---|---|
| CC0 | 1 | 1 | 1 | NA | NA | 0 | 1 | 1 |
| CC1 | NA | NA | 1 | NA | NA | 1 | NA | NA |

When generating HARQ-ACK information in Slot8 PUCCH, the delayed slot K1_def=161 of CC0 and the delayed slot K1_def=161 of CC1 are determined.

First, a K1 slot set in each serving cell is traversed, and afterward, the delayed HARQ-ACK feedback slot is traversed to acquire the SPS PDSCH HARQ-ACK information corresponding to the delayed HARQ-ACK feedback slot.

Determination of a slot corresponding to HARQ-ACK of the PDSCH in Slot 5, Slot 6, and Slot 7 is similar as the existing techniques, and is not described in detail here.

On CC0, it is determined that the PUCCH in Slot8 needs to carry K1={1, 2, 3} PDSCH HARQ-ACK, and an index set of all PDSCH slots that require feedback is {slot5, slot6, slot7}. Slots in the set are traversed. HARQ-ACK of possible PDSCH positions is arranged in an ascending order of downlink slot as {0, 1, 0}, where slot 7 is filled as NACK (0) as there is no PDSCH requires to be fed back on the PUCCH.

On CC1, it is determined that the PUCCH in Slot8 needs to carry K1={1, 2, 3} PDSCH HARQ-ACK, and an index set of all PDSCH slots that require feedback is {slot5, slot6, slot7}. Slots in the set are traversed. HARQ-ACK of possible PDSCH positions is arranged in an ascending order of downlink slot as {1, 0, 0}, where slot 6 and slot 7 are filled as NACK (0) as there is no PDSCH requires to be fed back on the PUCCH.

On CC0, the HARQ-ACK of SPS PDSCH in slot 2 needs to be delayed to Slot8. Similarly, on CC1, the HARQ-ACK of SPS PDSCH in slot 2 needs to be delayed to Slot8. As SPS2 is configured not to allow a delay, the HARQ-ACK of PDSCH in slot 2 on CC1 is dropped.

The codebook generated according to the above-mentioned first way is 100/1/110/0, where the first three bits are bit information generated on CC0 according to an existing method, and the fourth bit is HARQ-ACK of the delayed downlink slot SPS PDSCH1 on CC0. The fifth to seventh bits are bit information generated on CC1 according to the existing method, and the eighth bit is HARQ-ACK of the delayed downlink slot SPS PDSCH2 on CC1. It should be noted that slashes in the codebook are merely for convenience of understanding and do not exist in the actual codebook.

A generation process of the HARQ-ACK codebook using the above-mentioned second way is similar to that using the first way. A difference lies in that in the second way, it is necessary to finally traverse the delayed HARQ-ACK feedback slots and sort them by the cell index to generate SPS PDSCH HARQ-ACK information corresponding to all cells. The codebook generated according to the second way is 100/110/10, where the first three bits are the HARQ-ACK information of the original downlink slots of all cells generated on CC0 according to the existing method, and the fourth to sixth bits are the HARQ-ACK information of the original downlink slots of all cells generated on CC1 according to the existing method, the seventh bit is the HARQ-ACK of SPS PDSCH1 of the delayed downlink slot on CC0, and the eighth bit is the HARQ-ACK of SPS PDSCH2 of the delayed downlink slot on CC1.

The second method is generating the semi-static HARQ-ACK codebook by expanding a K1 slot set based on the delayed downlink slot, and generating the semi-static HARQ-ACK codebook based on the expanded K1 slot set.

Specifically, a delay slot is added to the K1 slot set based on the delayed downlink slot to acquire the expanded K1 slot set.

The second method is further described in detail below with reference to the PDSCH configured in the serving cell as shown in FIG. 6.

When generating HARQ-ACK information in Slot8 PUCCH, the delayed slot $K1\_def=\{6\}$ of CC0 and the delayed slot $K1\_def=\{6\}$ of CC1 are determined. Therefore, the K1 slot set is expanded based on the delayed downlink slot, and the expanded K1 slot set is $K1=\{1, 2, 3, 6\}$.

The above K1 slot set is traversed, for the HARQ-ACK in slot 2, on CC0, the HARQ-ACK of SPS PDSCH in slot 2 needs to be delayed to Slot8. Similarly, on CC1, the HARQ-ACK of SPS PDSCH in slot 2 needs to be delayed to Slot8. As SPS2 is configured not to allow a delay, the HARQ-ACK of PDSCH in slot 2 on CC1 is dropped.

On CC0, slots in the K1 slot set are traversed. As there is merely one SPS PDSCH in slot 2, its corresponding HARQ-ACK is 1. Therefore, the HARQ-ACK is arranged in an ascending order of SPS configuration index in each downlink slot as $\{1\}$.

On CC1, slots in the K1 slot set are traversed. The HARQ-ACK is arranged in an ascending order of SPS configuration index in each downlink slot as $\{1\}$.

Determination of slots corresponding to the HARQ-ACK of the PDSCH in Slot5, Slot6, and Slot7 is the same as the existing techniques, and is not described in detail here.

On CC0, it is determined that the PUCCH in Slot8 needs to carry $K1=\{1, 2, 3\}$ PDSCH HARQ-ACK, and an index set of all the slots that require PDSCH feedback is $\{Slot5, Slot6, Slot7\}$. Slots in the set are traversed. HARQ-ACK of possible PDSCH positions is arranged in an ascending order of downlink slot as $\{0, 1, 0\}$. Slot 7 is filled as NACK (0) as there is no PDSCH that needs to be fed back on the PUCCH.

On CC1, it is determined that the PUCCH in Slot8 needs to carry $K1=\{1, 2, 3\}$ PDSCH HARQ-ACK, and an index set of all the slots that require PDSCH feedback is $\{Slot5, Slot6, Slot7\}$. Slots in the set are traversed. HARQ-ACK of possible PDSCH positions is arranged in an ascending order of downlink slot as $\{1, 0, 0\}$. Slot 6 and Slot 7 are filled as NACK (0) as there is no PDSCH that needs to be fed back on the PUCCH.

Based on the above process, it is determined that the HARQ-ACK feedback information in Slot8 is $\{11010100\}$.

When generating a dynamic HARQ-ACK codebook, a following method may be adopted.

A first codebook is generated based on DAI indication in DCI, a second codebook is generated based on the HARQ-ACK information of the delayed downlink slot, and the dynamic codebook is acquired by disposing the second codebook behind the first codebook.

In 404, the terminal device transmits the HARQ-ACK codebook using an uplink channel.

With the retransmission response feedback method provided in the embodiments of the present disclosure, serving cells are traversed to determine HARQ-ACK of an original downlink slot and a delayed downlink slot in each serving cell for which an uplink channel resource requires feedback, HARQ-ACK information of the original downlink slot and HARQ-ACK information of the delayed downlink slot are acquired, respectively, a HARQ-ACK codebook is generated based on the HARQ-ACK information of the original downlink slot and the HARQ-ACK information of the delayed downlink slot, and the HARQ-ACK codebook is transmitted using an uplink channel, thereby ensuring effective feedback of SPS PDSCH HARQ-ACK, and further improving performance of a terminal device and communication quality.

As mentioned above, when delayed feedback is required for SPS PDSCH HARQ-ACK, the specific slot of the PUCCH resource to which it is delayed may be determined using existing techniques and is not limited in the embodiment as shown in FIG. 4.

Further, a method for determining a delayed downlink slot that requires feedback of SPS PDSCH HARQ-ACK in an uplink channel resource is further provided in an embodiment. Serving cells are traversed, and the delayed downlink slot in the uplink channel resource that requires feedback of SPS PDSCH HARQ-ACK is determined based on a first configuration parameter configured by a high layer. The first configuration parameter indicates a maximum allowed delayed feedback slot offset of SPS PDSCH HARQ-ACK, and has a unit of slot or sub-slot.

It should be noted that the first configuration parameter may indicate that all SPS PDSCH configuration can delay feedback of HARQ-ACK, or indicate that one or more SPS PDSCH configuration can delay feedback, and others cannot delay feedback. In addition, all SPS PDSCHs may share the first configuration parameter; or each SPS PDSCH corresponds to its own first configuration parameter, which is not limited in the embodiments of the present disclosure.

Further, all SPS PDSCHs may be configured to share the first configuration parameter, that is, different SPS PDSCHs have the same first configuration parameter. Alternatively, each SPS PDSCH may be configured to correspond to its own first configuration parameter, that is, the configuration parameters corresponding to different SPS PDSCHs may be the same or different, which is not limited in the embodiments.

For example, when the SPS PDSCH cannot delay feedback of HARQ-ACK, N=0; when the SPS PDSCH can delay feedback of HARQ-ACK, N is a value greater than 1, and the unit is the same as SPS PDSCH HARQ-ACK feedback, which may be slot or sub-slot.

Figure 7:
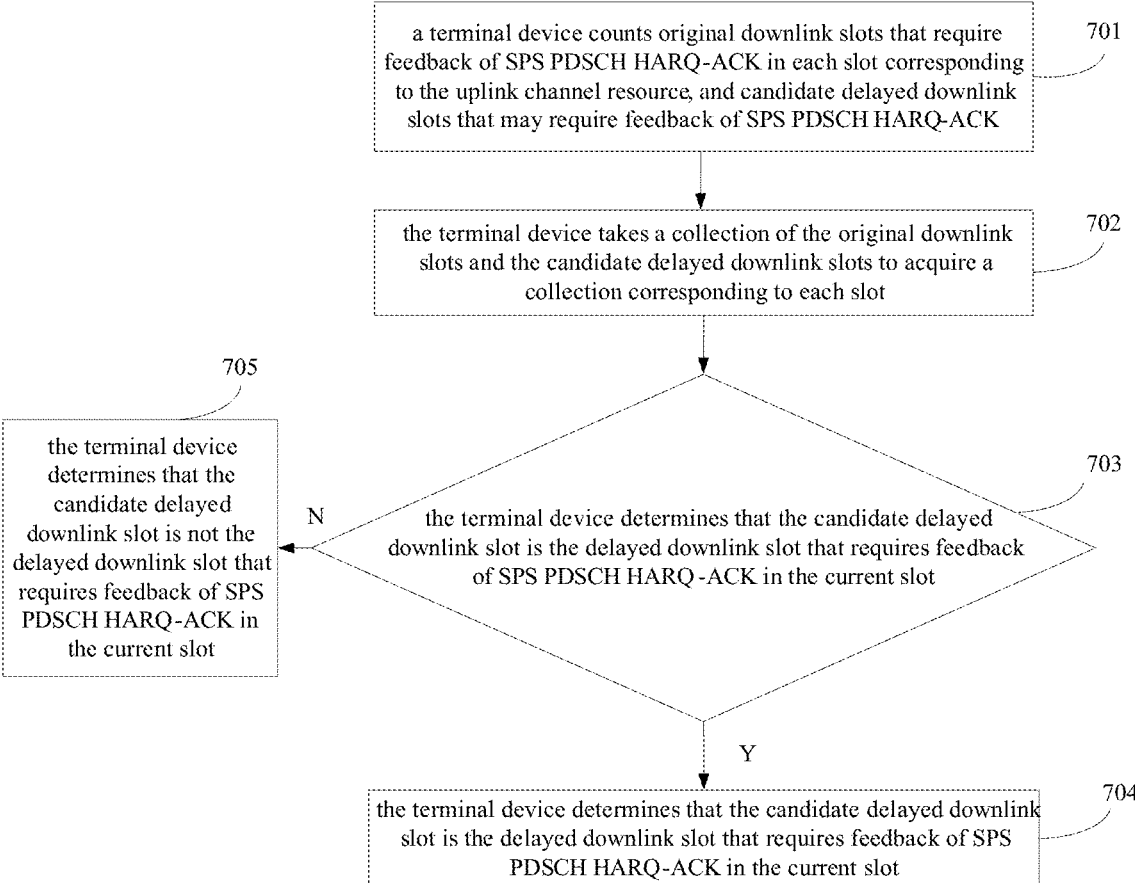
FIG. 7 is a flow chart of determining original downlink slots that need to feed back SPS PDSCH HARQ-ACK in each slot and corresponding delayed downlink slots according to an embodiment.

A method for determining the delayed downlink slot in the uplink channel resource that requires feedback of SPS PDSCH HARQ-ACK based on the first configuration parameter is shown in FIG. 7, which includes 701 to 705.

In 701, a terminal device counts original downlink slots that require feedback of SPS PDSCH HARQ-ACK in each slot corresponding to the uplink channel resource, and candidate delayed downlink slots that may require feedback of SPS PDSCH HARQ-ACK.

Specifically, it is necessary to traverse each serving cell and the SPS PDSCH configured on each serving cell and determine the HARQ-ACK slot corresponding to each SPS PDSCH based on a configuration parameter of each SPS PDSCH. If a slot where SPS PDSCH1 is located is slot a1, a slot where the corresponding HARQ-ACK is located is slot b1. If the slot where SPS PDSCH1 is located is slot a2, the slot where the corresponding HARQ-ACK is located is slot b2.

SPS PDSCH1 is traversed. If there are uplink UL symbols in slot b1, and a configured SPS PDSCH HARQ-ACK PUCCH resource can be used, the original downlink slot that requires feedback of SPS PDSCH HARQ-ACK in slot b1 includes slot a1;

SPS PDSCH2 is traversed. If there are downlink DL symbols in slot b2, and a configured SPS PDSCH HARQ-ACK PUCCH resource cannot be used, a next available PUCCH resource, such as a slot bn, can be used for transmitting information corresponding to SPS PDSCH2 HARQ-ACK in slot b2, and the original downlink slot that may require feedback of SPS PDSCH HARQ-ACK in slot bn includes slot a2.

In 702, the terminal device takes a collection of the original downlink slots and the candidate delayed downlink slots to acquire a collection corresponding to each slot.

In 703, the terminal device takes each slot corresponding to the uplink channel resource as a current slot successively, determines each candidate delayed downlink slot in the collection corresponding to the current slot as a to-be-detected slot, and detects whether a difference between the original downlink slot corresponding to the to-be-detected slot and the current slot is less than or equal to the first configuration parameter corresponding to the SPS PDSCH. In response to the difference being less than or equal to the first configuration parameter corresponding to the SPS PDSCH, 704 is performed; otherwise, 705 is performed.

In 704, the terminal device determines that the candidate delayed downlink slot is the delayed downlink slot that requires feedback of SPS PDSCH HARQ-ACK in the current slot.

In 705, the terminal device determines that the candidate delayed downlink slot is not the delayed downlink slot that requires feedback of SPS PDSCH HARQ-ACK in the current slot.

A process of implementing SPS PDSCH HARQ-ACK using the embodiment as shown in FIG. 7 is described in detail with reference to FIG. 8.

Figure 8:
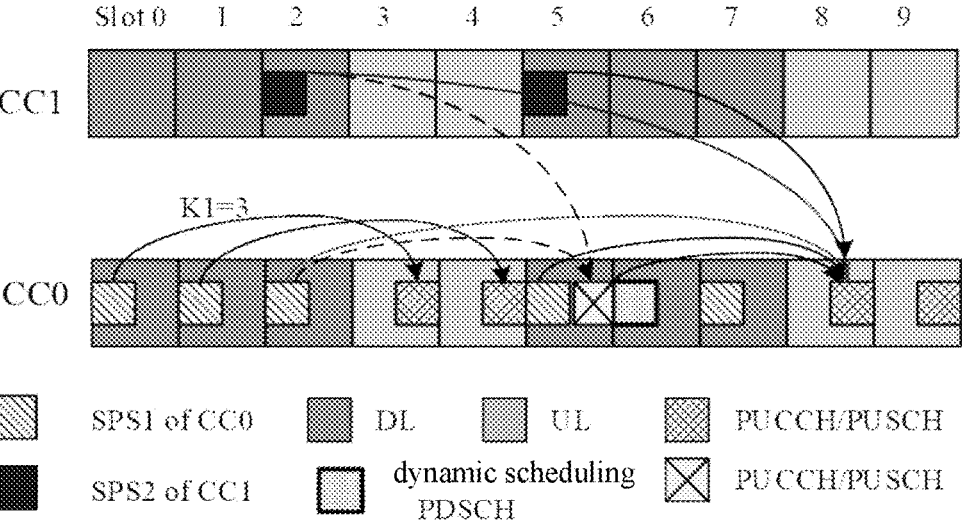
FIG. 8 is an example of SPS PDSCH configured on different serving cells and corresponding feedback of SPS PDSCH HARQ-ACK according to an embodiment.

As shown in FIG. 8, there are two carriers including CC0 and CC1, where merely CC0 transmits PUCCH, and offset K1 of the HARQ-ACK feedback of SPS1 and SPS2 is 3.

One SPS PDSCH is configured on the CC0 serving cell, which is SPS PDSCH1 (for ease of description, it is called SPS1 hereinafter), and has a cycle of 1 slot. SPS1 is configured to allow a delay, and its corresponding first configuration parameter $N_1=3$.

One SPS PDSCH is configured on the CC1 serving cell, which is SPS PDSCH2 (for ease of description, it is called SPS2 hereinafter), and has a cycle of 3 slots. SPS2 is configured not to allow a delay, that is, its corresponding first configuration parameter $N_2=0$.

SPS1 is located in Slot0, Slot1, Slot2, Slot5, Slot6, and Slot7. Slots where the HARQ-ACK information corresponding to Slot0, Slot1, Slot2, and Slot5 is located include Slot3, Slot4, Slot5, and Slot8. As Slot5 includes downlink DL symbols, a configured SPS PDSCH HARQ-ACK PUCCH resource cannot be used. One way is to transmit the HARQ-ACK information corresponding to SPS1 in Slot5 using a next available PUCCH resource, i.e., Slot8.

SPS2 is located in Slot2 and Slot5. Slots where the HARQ-ACK information corresponding to Slot2 and Slot5 is located include Slot5 and Slot8. Similarly, as Slot5 includes downlink DL symbols, the configured SPS PDSCH HARQ-ACK PUCCH resource cannot be used. One way is to transmit the HARQ-ACK information corresponding to SPS2 in Slot5 using the next available PUCCH resource, that is, Slot8.

Therefore, according to 701, counting original downlink slots that require feedback of SPS PDSCH HARQ-ACK in each slot corresponding to the uplink channel resource is as follows:

Slot3: SPS1-Slot0;
Slot4: SPS1-Slot1;
Slot8: SPS1-Slot5, SPS2-Slot5.

Counting candidate delayed downlink slots that may require feedback of SPS PDSCH HARQ-ACK is as follows: Slot8: SPS1-Slot2, SPS2-Slot2.

According to 702, the original downlink slot and the delayed downlink slot obtained by statistics are combined to obtain the set corresponding to each slot. The set corresponding to Slot8 is {original downlink slot: SPS1-Slot5, SPS2-Slot5; delayed downlink slots: SPS1-Slot5, SPS2-Slot5}.

According to 703 and 704, Slot3, Slot4 and Slot8 corresponding to the uplink channel resource are successively used as the current slot, each candidate delayed downlink slot in the collection corresponding to the current slot is determined as a to-be-detected slot, and whether a difference between the original downlink slot corresponding to the to-be-detected slot and the current slot is less than or equal to the first configuration parameter corresponding to the SPS PDSCH is determined.

For the delayed downlink slot SPS1-Slot2 in Slot8, the corresponding original downlink slot of SPS PDSCH HARQ-ACK is Slot5, and a difference from Slot8 is 3. As SPS1 is configured to allow a delay, $N_1=3$. The difference=3, which is equal to a delay threshold 3 corresponding to SPS1. Therefore, the SPS PDSCH HARQ-ACK corresponding to the delayed downlink slot Slot2-SPS1 is determined to be fed back in Slot8.

For the delayed downlink slot Slot2-SPS2 in Slot8, the corresponding original downlink slot of SPS PDSCH HARQ-ACK is Slot5, and a difference from Slot8 is 3. As SPS2 is configured not to allow a delay, its corresponding first configuration parameter $N_2=0$, and the difference value=3, which is greater than a delay threshold 0 corresponding to SPS2. Therefore, the SPS PDSCH HARQ-ACK corresponding to the delayed downlink slot Slot5-SPS2 cannot be fed back in Slot8.

A transmission situation of the SPS PDSCH and the HARQ-ACK information corresponding to the SPS PDSCH in each slot is shown in Table 2 below, where ACK is represented by 1 and NACK is represented by 0.

TABLE 2

| Slot index | Slot 0 | 1 | 2 | 3 | 4 | 5 | 6 | 7 |
|---|---|---|---|---|---|---|---|---|
| CC0 | 1 | 1 | 1 | NA | NA | 0 | 1 | 1 |
| CC1 | NA | NA | 1 | NA | NA | 1 | NA | NA |

According to the above analysis, the HARQ-ACK feedback information on Slot8 is {101}.

A third parameter g indicates that if a slot for feedback of HARQ-ACK corresponding to SPS PDSCH does not have available PUCCH resources, the slot for feedback of HARQ-ACK corresponding to SPS PDSCH may be delayed, $g \in \{1 \ldots N\}$, N represents a maximum value of slots for the delay of feedback of the HARQ-ACK corresponding to the SPS PDSCH, i.e., the delay threshold mentioned above.

Figure 9:
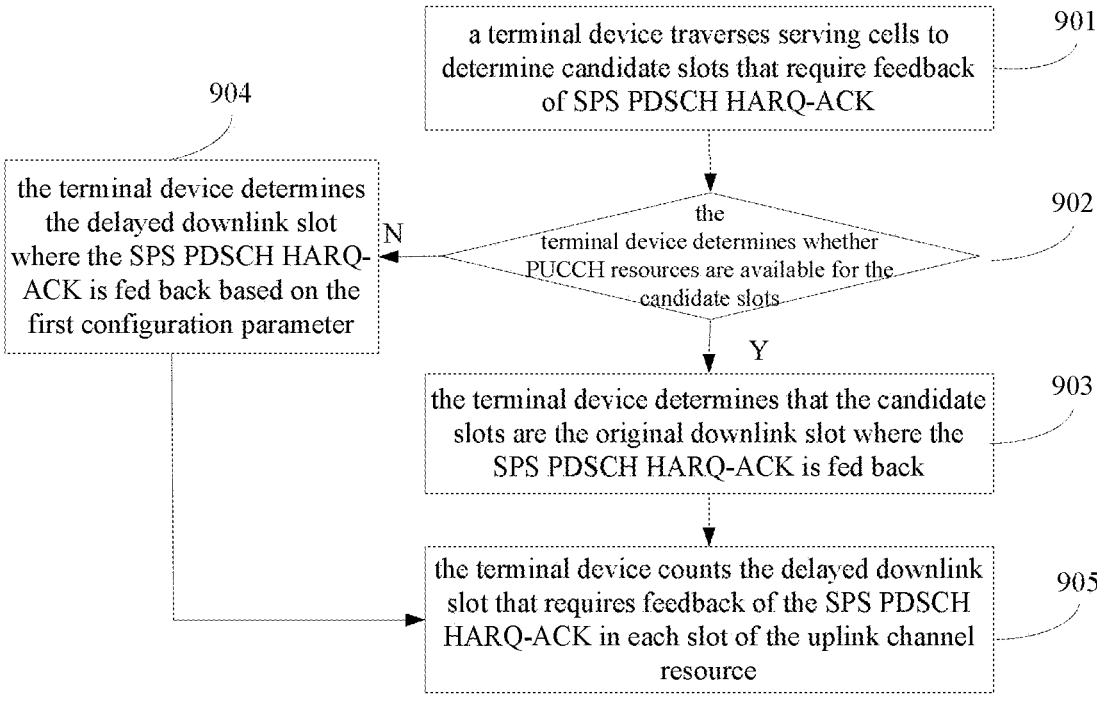
FIG. 9 is a flow chart of determining original downlink slots that need to feed back SPS PDSCH HARQ-ACK in each slot and corresponding delayed downlink slots according to an embodiment.

Accordingly, a method for determining the delayed downlink slot in the uplink channel resource that requires feedback of SPS PDSCH HARQ-ACK based on the first configuration parameter is shown in FIG. 9, which includes 901 to 905.

In 901, a terminal device traverses serving cells to determine candidate slots that require feedback of SPS PDSCH HARQ-ACK.

In 902, the terminal device determines whether PUCCH resources are available for the candidate slots, if yes, 903 is performed, otherwise, 904 is performed.

In 903, the terminal device determines that the candidate slots are the original downlink slot where the SPS PDSCH HARQ-ACK is fed back.

In 904, the terminal device determines the delayed downlink slot where the SPS PDSCH HARQ-ACK is fed back based on the first configuration parameter.

In 905, the terminal device counts the delayed downlink slot that requires feedback of the SPS PDSCH HARQ-ACK in each slot of the uplink channel resource.

Still referring to FIG. 8, one SPS PDSCH is configured on the CC0 serving cell, and has a cycle of 1 slot. SPS1 is configured to allow a delay, and its corresponding first configuration parameter $N_1=3$. One SPS PDSCH is configured on the CC1 serving cell and has a cycle of 3 slots. SPS2 is configured to not allow a delay, accordingly, its corresponding first configuration parameter $N_2=0$.

By using the method as shown in FIG. 9 to traverse the SPS PDSCH configured on each serving cell, it is determined that downlink slots that requires feedback in Slot8 include SPS PDSCH HARQ-ACK in Slot5 and SPS PDSCH HARQ-ACK in Slot2 on CC0, SPS PDSCH HARQ-ACK in Slot5 on CC1. According to the HARQ-ACK information in Table 1, it is determined that the HARQ-ACK feedback information on Slot8 is {101}.

The method in the embodiment as shown in FIG. 7 or FIG. 9 may enable to more conveniently and accurately determine the delayed downlink slot in the uplink channel resource that requires feedback of SPS PDSCH HARQ-ACK.

FIG. 10 is a block diagram of a retransmission response feedback apparatus according to an embodiment. Referring to FIG. 10, the apparatus includes an original downlink slot determining circuitry 11, a delayed downlink slot determining circuitry 12, a feedback information acquiring circuitry 13, a codebook generating circuitry 14 and a transmitting circuitry 15.

The original downlink slot determining circuitry 11 is configured to traverse serving cells to determine HARQ-ACK of an original downlink slot in each serving cell for which an uplink channel resource requires feedback, wherein the original downlink slot refers to a downlink slot corresponding to an ACK/NACK feedback determined based on a slot offset K1 from a PDSCH to the ACK/NACK feedback.

The delayed downlink slot determining circuitry 12 is configured to traverse the serving cells to determine HARQ-ACK of a delayed downlink slot in each serving cell for which the uplink channel resource requires feedback, wherein the delayed downlink slot refers to a downlink slot in which the ACK/NACK feedback determined based on the slot offset K1 is transmitted with a delay.

The feedback information acquiring circuitry 13 is configured to acquire HARQ-ACK information of the original downlink slot and HARQ-ACK information of the delayed downlink slot, respectively.

The codebook generating circuitry 14 is configured to generate a HARQ-ACK codebook based on the HARQ-ACK information of the original downlink slot and the HARQ-ACK information of the delayed downlink slot.

The transmitting circuitry 15 is configured to transmit the HARQ-ACK codebook using an uplink channel.

FIG. 11 is a block diagram of the codebook generating circuitry 14 according to an embodiment, where the codebook generating circuitry 14 includes an SPS codebook generating circuitry 141, a codebook type determining circuitry 140, a semi-static codebook generating circuitry 142 and a dynamic codebook generating circuitry 143.

The SPS codebook generating circuitry 141 is configured to: based on that there is only SPS PDSCH HARQ-ACK feedback, arrange the HARQ-ACK information of the original downlink slot and the HARQ-ACK information of the delayed downlink slot in an ascending order of downlink slots with {SPS configuration index, serving cell index}, then arrange the HARQ-ACK information in an ascending order of the SPS configuration index in each serving cell index, and finally arrange the HARQ-ACK information in an ascending order of the serving cell index, to generate an SPS PDSCH HARQ-ACK codebook.

The codebook type determining circuitry 140 is configured to: based on that there is HARQ-ACK feedback of dynamical scheduling PDSCH and/or HARQ-ACK feedback of PDCCH released by SPS PDSCH, and there is SPS PDSCH HARQ-ACK feedback, determining a type of the HARQ-ACK codebook based on high-layer configuration information.

The semi-static codebook generating circuitry 142 is configured to: in response to the codebook type determining circuitry determining the type to be a semi-static HARQ-ACK codebook, generate the semi-static HARQ-ACK codebook.

The dynamic codebook generating circuitry 143 is configured to: in response to the codebook type determining circuitry determining the type to be a dynamic codebook, generate a first codebook based on DAI indication in DCI, generate a second codebook based on the HARQ-ACK information of the delayed downlink slot, and acquire the dynamic codebook by disposing the second codebook behind the first codebook. For example, the HARQ-ACK information of the delayed downlink slot is arranged in an ascending order of downlink slots with {SPS configuration index, serving cell index}, then the HARQ-ACK information is arranged in an ascending order of the SPS configuration index in each serving cell index, and finally the HARQ-ACK information is arranged in an ascending order of the serving cell index, to generate the second codebook.

As illustrated in FIG. 11, the semi-static codebook generating circuitry 142 includes a first semi-static codebook generating circuitry 1421 or a second semi-static codebook generating circuitry 1422.

The first semi-static codebook generating circuitry 1421 is configured to generate the semi-static HARQ-ACK codebook by disposing the HARQ-ACK information of the delayed downlink slot behind the HARQ-ACK information of the original downlink slot.

The second semi-static codebook generating circuitry 1422 is configured to expand a K1 slot set based on the delayed downlink slot and generate the semi-static HARQ-ACK codebook based on the expanded K1 slot set.

In practice, the first semi-static codebook generating circuitry 1421 is configured to: generate the semi-static HARQ-ACK codebook by disposing in sequence the HARQ-ACK information of the delayed downlink slot of each serving cell after the HARQ-ACK information of the original downlink slot of the serving cell; or generate the semi-static HARQ-ACK codebook by disposing the HARQ-ACK information of the delayed downlink slot of all serving cells behind the HARQ-ACK information of the original downlink slot of all the serving cells and arranging the HARQ-ACK information according to cell index.

The second semi-static codebook generating circuitry 1422 is configured to: add a delay slot to the K1 slot set based on the delayed downlink slot to acquire the expanded K1 slot set and generate the semi-static HARQ-ACK codebook based on the expanded K1 slot set.

With the retransmission response feedback apparatus provided in the embodiments of the present disclosure, serving cells are traversed to determine HARQ-ACK of an original downlink slot and a delayed downlink slot in each serving cell for which an uplink channel resource requires feedback, HARQ-ACK information of the original downlink slot and HARQ-ACK information of the delayed downlink slot are acquired, respectively, a HARQ-ACK codebook is generated based on the HARQ-ACK information of the original downlink slot and the HARQ-ACK information of the delayed downlink slot, and the HARQ-ACK codebook is transmitted using an uplink channel, thereby ensuring effective feedback of SPS PDSCH HARQ-ACK, and further improving performance of a terminal device and communication quality.

In some embodiments, when delayed feedback is required for the SPS PDSCH HARQ-ACK, a specific slot of the PUCCH resource to which it can be delayed may be determined using existing techniques, which is not limited in the embodiments of the present disclosure.

Further, in some embodiments of the retransmission response feedback apparatus, a first configuration parameter configured by a high layer may be used to determine the delayed downlink slot in the uplink channel resource for which SPS PDSCH HARQ-ACK requires feedback. The first configuration parameter indicates a maximum allowed delayed feedback slot offset of SPS PDSCH HARQ-ACK, and has a unit of slot or sub-slot.

It should be noted that the first configuration parameter may indicate that all SPS PDSCH configuration can delay feedback of HARQ-ACK, or indicate that one or more SPS PDSCH configuration can delay feedback, and others cannot delay feedback. In addition, all SPS PDSCHs may share the first configuration parameter; or each SPS PDSCH corresponds to its own first configuration parameter, which is not limited in the embodiments of the present disclosure.

Further, all SPS PDSCHs may be configured to share the first configuration parameter, that is, different SPS PDSCHs have the same first configuration parameter. Alternatively, each SPS PDSCH may be configured to correspond to its own first configuration parameter, that is, the configuration parameters corresponding to different SPS PDSCHs may be the same or different, which is not limited in the embodiments.

Figure 12:
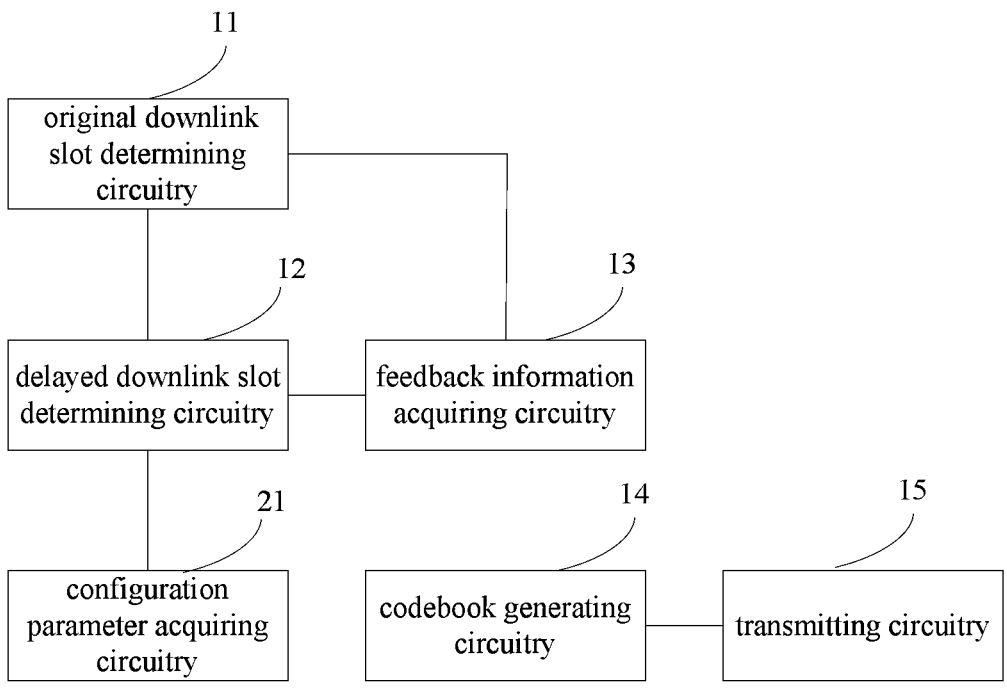
FIG. 12 is a block diagram of a retransmission response feedback apparatus according to an embodiment.

FIG. 12 is a block diagram of a retransmission response feedback apparatus according to an embodiment. Different from FIG. 10, the retransmission response feedback apparatus further includes a configuration parameter acquiring circuitry 21 configured to acquire a first configuration parameter configured by a high layer, wherein the first configuration parameter indicates a maximum allowed delayed feedback slot offset of SPS PDSCH HARQ-ACK.

Accordingly, in the embodiment, the delayed downlink slot determining circuitry 12 is configured to: traverse SPS PDSCHs configured in the serving cells and determine the delayed downlink slot that requires feedback of the SPS PDSCH HARQ-ACK in each slot of the uplink channel resource based on the first configuration parameter.

Figure 13:
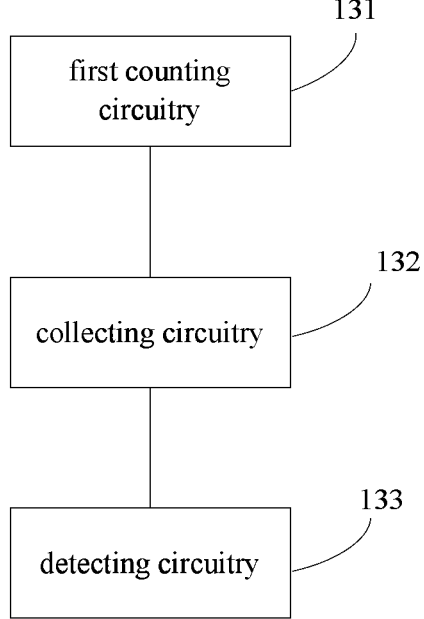
FIG. 13 is a block diagram of a delayed downlink slot determination circuitry according to an embodiment.

FIG. 13 is a block diagram of the delayed downlink slot determination circuitry 12 according to an embodiment. The delayed downlink slot determination circuitry 12 includes a first counting circuitry 131, a collecting circuitry 132 and a detecting circuitry 133.

The first counting circuitry 131 is configured to count original downlink slots that require feedback of SPS PDSCH HARQ-ACK in each slot corresponding to the uplink channel resource, and candidate delayed downlink slots that may require feedback of SPS PDSCH HARQ-ACK in the slot.

The collecting circuitry 132 is configured to take a collection of the original downlink slots and the candidate delayed downlink slots to acquire a collection corresponding to each slot.

The detecting circuitry 133 is configured to: take each slot corresponding to the uplink channel resource as a current slot successively, determine each candidate delayed downlink slot in the collection corresponding to the current slot as a to-be-detected slot, detect whether a difference between the original downlink slot corresponding to the to-be-detected slot and the current slot is less than or equal to the first configuration parameter corresponding to the SPS PDSCH, and in response to the difference being less than or equal to the first configuration parameter corresponding to the SPS PDSCH, determine that the candidate delayed downlink slot is the delayed downlink slot that requires feedback of SPS PDSCH HARQ-ACK in the current slot.

Figure 14:
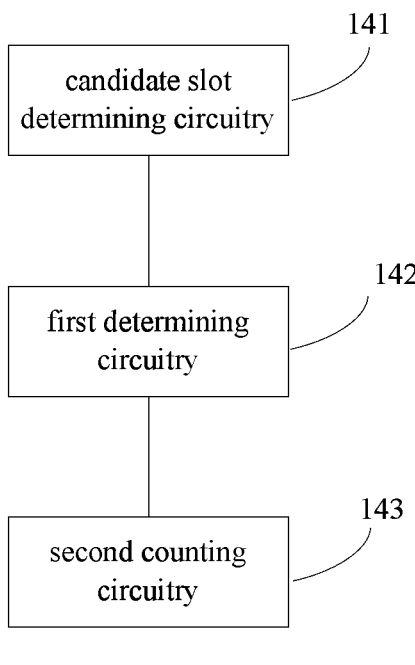
FIG. 14 is a block diagram of a delayed downlink slot determination circuitry according to an embodiment.

FIG. 14 is a block diagram of a delayed downlink slot determination circuitry 12 according to an embodiment. The delayed downlink slot determination circuitry 12 includes a candidate slot determining circuitry 141, a first determining circuitry 142 and a second counting circuitry 143.

The candidate slot determining circuitry 141 is configured to: traverse the serving cells, and determine candidate slots that require feedback of SPS PDSCH HARQ-ACK.

The first determining circuitry 142 is configured to: in response to no PUCCH resources being available for the candidate slots, determine the delayed downlink slot that requires feedback of the SPS PDSCH HARQ-ACK based on the first configuration parameter.

The second counting circuitry 143 is configured to count the delayed downlink slot that requires feedback of the SPS PDSCH HARQ-ACK in each slot of the uplink channel resource.

The apparatus in the embodiment as shown in FIG. 13 or FIG. 14 may enable to more conveniently and accurately determine the delayed downlink slot in the uplink channel resource that requires feedback of SPS PDSCH HARQ-ACK.

With the retransmission response feedback apparatus provided in the embodiments of the present disclosure, serving cells are traversed to determine HARQ-ACK of an original downlink slot and a delayed downlink slot in each serving cell for which an uplink channel resource requires feedback, HARQ-ACK information of the original downlink slot and HARQ-ACK information of the delayed downlink slot are acquired, respectively, a HARQ-ACK codebook is generated based on the HARQ-ACK information of the original downlink slot and the HARQ-ACK information of the delayed downlink slot, and the HARQ-ACK codebook is transmitted using an uplink channel, thereby ensuring effective feedback of SPS PDSCH HARQ-ACK, and further improving performance of a terminal device and communication quality.

In some embodiments, the above apparatus may correspond to a chip with a transmission resource selection function in a communication device, such as a System-On-Chip (SOC) or a baseband chip, or to a chip module with a transmission resource selection function in the communication device, or to a chip module including a chip with a data processing function.

Each module/unit of each apparatus and product described in the above embodiments may be a software module/unit or a hardware module/unit or may be a software module/unit in part, and a hardware module/unit in part.

For example, for each apparatus or product applied to or integrated in a chip, each module/unit included therein may be implemented by hardware such as circuits; or, at least some modules/units may be implemented by a software program running on a processor integrated inside the chip, and the remaining (if any) part of the modules/units may be implemented by hardware such as circuits. For each apparatus or product applied to or integrated in a chip module, each module/unit included therein may be implemented by hardware such as circuits. Different modules/units may be disposed in a same component (such as a chip or a circuit module) or in different components of the chip module. Or at least some modules/units may be implemented by a software program running on a processor integrated inside the chip module, and the remaining (if any) part of the modules/units may be implemented by hardware such as circuits. For each apparatus or product applied to or integrated in a terminal, each module/unit included therein may be implemented by hardware such as circuits. Different modules/units may be disposed in a same component (such as a chip or a circuit module) or in different components of the terminal. Or at least some modules/units may be implemented by a software program running on a processor integrated inside the terminal, and the remaining (if any) part of the modules/units may be implemented by hardware such as circuits.

In an embodiment of the present disclosure, a communication device including the above retransmission response feedback apparatus is provided. The communication device is a terminal device which may refer to various forms of UE, access terminal, user unit, user station, Mobile Station (MS), remote station, remote terminal, mobile equipment, user terminal, terminal equipment, wireless communication equipment, user agent or user device. The terminal equipment may further be a cellular phone, a cordless phone, a Session Initiation Protocol (SIP) phone, a Wireless Local Loop (WLL) station, a Personal Digital Assistant (PDA), a handheld device with a wireless communication function, a computing device or other processing devices connected to a wireless modems, an in-vehicle device, a wearable device, a terminal equipment in the future 5G network, or a terminal equipment in a future evolved Public Land Mobile Network (PLMN), which is not limited in the embodiments of the present disclosure.

The technical solutions of the present disclosure can be applied to 5G, 4G or 3G communication systems, and various new communication systems in the future, such as 6G and 7G communication systems, which is not limited in the embodiments.

The technical solutions of the present disclosure are also applicable to different network architectures, including but not limited to a relay network architecture, a dual-link network architecture, a Vehicle-to-Everything (V2X) communication architecture, or a Device-to-Device (D2D) communication architecture.

In an embodiment of the present disclosure, a non-volatile or non-transitory computer-readable storage medium having computer instructions stored therein is provided, wherein when the computer instructions are executed by a processor, the method as shown in FIG. 4, FIG. 7 or FIG. 9 is performed.

In an embodiment of the present disclosure, an electronic device including a memory and a processor is provided, wherein when the computer instructions are executed by a processor, the method as shown in FIG. 4, FIG. 7 or FIG. 9 is performed.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A retransmission response feedback method, comprising:

determining an original downlink slot and a delayed downlink slot that require HARQ-ACK feedback, wherein the original downlink slot refers to a downlink slot corresponding to an ACK/NACK feedback determined based on a slot offset K1 from a PDSCH to the ACK/NACK feedback, and the delayed downlink slot refers to a downlink slot in which the ACK/NACK feedback determined based on the slot offset K1 is transmitted with a delay;

acquiring HARQ-ACK information of the original downlink slot and HARQ-ACK information of the delayed downlink slot, respectively;

generating a HARQ-ACK codebook based on the HARQ-ACK information of the original downlink slot and the HARQ-ACK information of the delayed downlink slot; and transmitting the HARQ-ACK codebook using an uplink channel;

wherein said generating the HARQ-ACK codebook based on the HARQ-ACK information of the original downlink slot and the HARQ-ACK information of the delayed downlink slot comprises:

based on that there is HARQ-ACK feedback of dynamical scheduling PDSCH and/or HARQ-ACK feedback of SPS PDSCH released by PDCCH, and there is SPS PDSCH HARQ-ACK feedback, determining a type of the HARQ-ACK codebook based on high-layer configuration information;

in response to the type being a semi-static HARQ-ACK codebook, generating the semi-static HARQ-ACK codebook by disposing the HARQ-ACK information of the delayed downlink slot behind the HARQ-ACK information of the original downlink slot; or in response to the type being a dynamic codebook, generating a first codebook based on DAI indication in DCI, generating a second codebook based on the HARQ-ACK information of the delayed downlink slot, and acquiring the dynamic codebook by disposing the second codebook behind the first codebook.

2. The method according to claim 1, wherein said generating the HARQ-ACK codebook based on the HARQ-ACK information of the original downlink slot and the HARQ-ACK information of the delayed downlink slot further comprises:

based on that there is only SPS PDSCH HARQ-ACK feedback, arranging the HARQ-ACK information of the original downlink slot and the HARQ-ACK information of the delayed downlink slot in an ascending order of downlink slots with {SPS configuration index, serving cell index}, then arranging the HARQ-ACK information in an ascending order of the SPS configuration index in each serving cell index, and finally arranging the HARQ-ACK information in an ascending order of the serving cell index, to generate an SPS PDSCH HARQ-ACK codebook.

3. The method according to claim 1, wherein said generating the semi-static HARQ-ACK codebook by disposing the HARQ-ACK information of the delayed downlink slot behind the HARQ-ACK information of the original downlink slot comprises:

generating the semi-static HARQ-ACK codebook by disposing in sequence the HARQ-ACK information of the delayed downlink slot of each serving cell after the HARQ-ACK information of the original downlink slot of the serving cell; or generating the semi-static HARQ-ACK codebook by disposing the HARQ-ACK information of the delayed downlink slot of all serving cells behind the HARQ-ACK information of the original downlink slot of all the serving cells and arranging the HARQ-ACK information according to cell index.

4. The method according to claim 1, wherein said generating the second codebook based on the HARQ-ACK information of the delayed downlink slot comprises:

arranging the HARQ-ACK information of the delayed downlink slot in an ascending order of downlink slots with {SPS configuration index, serving cell index}, then arranging the HARQ-ACK information in an ascending order of the SPS configuration index in each serving cell index, and finally arranging the HARQ-ACK information in an ascending order of the serving cell index, to generate the second codebook.

5. The method according to claim 1, further comprising:

acquiring a first configuration parameter configured by a high layer, wherein the first configuration parameter indicates a maximum allowed delayed feedback slot offset of SPS PDSCH HARQ-ACK; and traversing SPS PDSCHs configured in serving cells, and determining the delayed downlink slot that requires feedback of the SPS PDSCH HARQ-ACK in each slot of the uplink channel resource based on the first configuration parameter.

6. The method according to claim 5, wherein the SPS PDSCHs share the first configuration parameter; or each SPS PDSCH corresponds to own first configuration parameter.

7. The method according to claim 5, wherein traversing SPS PDSCHs configured in the serving cells, and determining the delayed downlink slot that requires feedback of the SPS PDSCH HARQ-ACK in each slot of the uplink channel resource based on the first configuration parameter comprises:

counting original downlink slots that require feedback of SPS PDSCH HARQ-ACK in each slot corresponding to the uplink channel resource, and candidate delayed downlink slots that may require feedback of SPS PDSCH HARQ-ACK;

taking a collection of the original downlink slots and the candidate delayed downlink slots to acquire a collection corresponding to each slot;

taking each slot corresponding to the uplink channel resource as a current slot successively, determining each candidate delayed downlink slot in the collection corresponding to the current slot as a to-be-detected slot, and detecting whether a difference between the original downlink slot corresponding to the to-be-detected slot and the current slot is less than or equal to the first configuration parameter corresponding to the SPS PDSCH; and in response to the difference being less than or equal to the first configuration parameter corresponding to the SPS PDSCH, determining that the candidate delayed downlink slot is the delayed downlink slot that requires feedback of SPS PDSCH HARQ-ACK in the current slot.

8. The method according to claim 5, wherein said traversing SPS PDSCHs configured in the serving cells, and determining the delayed downlink slot that requires feedback of the SPS PDSCH HARQ-ACK in each slot of the uplink channel resource based on the first configuration parameter comprises:

traversing the serving cells, and determining candidate slots that require feedback of SPS PDSCH HARQ-ACK;

in response to no PUCCH resources being available for the candidate slots, determining the delayed downlink slot that requires feedback of the SPS PDSCH HARQ-ACK based on the first configuration parameter; and counting the delayed downlink slot that requires feedback of the SPS PDSCH HARQ-ACK in each slot of the uplink channel resource.

9. A non-volatile or non-transitory computer-readable storage medium storing one or more programs, the one or more programs comprising computer instructions, which, when executed by a processor, cause the processor to:

determine an original downlink slot and a delayed downlink slot that require HARQ-ACK feedback, wherein the original downlink slot refers to a downlink slot corresponding to an ACK/NACK feedback determined based on a slot offset K1 from a PDSCH to the ACK/NACK feedback, and the delayed downlink slot refers to a downlink slot in which the ACK/NACK feedback determined based on the slot offset K1 is transmitted with a delay;

acquire HARQ-ACK information of the original downlink slot and HARQ-ACK information of the delayed downlink slot, respectively;

generate a HARQ-ACK codebook based on the HARQ-ACK information of the original downlink slot and the HARQ-ACK information of the delayed downlink slot; and transmit the HARQ-ACK codebook using an uplink channel;

wherein the processor is further caused to:

based on that there is HARQ-ACK feedback of dynamical scheduling PDSCH and/or HARQ-ACK feedback of SPS PDSCH released by PDCCH, and there is SPS PDSCH HARQ-ACK feedback, determine a type of the HARQ-ACK codebook based on high-layer configuration information;

in response to the type being a semi-static HARQ-ACK codebook, generate the semi-static HARQ-ACK codebook by disposing the HARQ-ACK information of the delayed downlink slot behind the HARQ-ACK information of the original downlink slot; or in response to the type being a dynamic codebook, generate a first codebook based on DAI indication in DCI, generate a second codebook based on the HARQ-ACK information of the delayed downlink slot, and acquire the dynamic codebook by disposing the second codebook behind the first codebook.

10. An electronic device comprising a memory and a processor, wherein the memory stores one or more programs, the one or more programs comprising computer instructions, which, when executed by the processor, cause the processor to:

determine an original downlink slot and a delayed downlink slot that require HARQ-ACK feedback, wherein the original downlink slot refers to a downlink slot corresponding to an ACK/NACK feedback determined based on a slot offset K1 from a PDSCH to the ACK/NACK feedback, and the delayed downlink slot refers to a downlink slot in which the ACK/NACK feedback determined based on the slot offset K1 is transmitted with a delay;

acquire HARQ-ACK information of the original downlink slot and HARQ-ACK information of the delayed downlink slot, respectively;

generate a HARQ-ACK codebook based on the HARQ-ACK information of the original downlink slot and the HARQ-ACK information of the delayed downlink slot; and transmit the HARQ-ACK codebook using an uplink channel;

wherein the processor is further caused to:

based on that there is HARQ-ACK feedback of dynamical scheduling PDSCH and/or HARQ-ACK feedback of SPS PDSCH released by PDCCH, and there is SPS PDSCH HARQ-ACK feedback, determine a type of the HARQ-ACK codebook based on high-layer configuration information;

in response to the type being a semi-static HARQ-ACK codebook, generate the semi-static HARQ-ACK codebook by disposing the HARQ-ACK information of the delayed downlink slot behind the HARQ-ACK information of the original downlink slot; or in response to the type being a dynamic codebook, generate a first codebook based on DAI indication in DCI, generate a second codebook based on the HARQ-ACK information of the delayed downlink slot, and acquire the dynamic codebook by disposing the second codebook behind the first codebook.

11. The electronic device according to claim 10, wherein the processor is further caused to:

based on that there is only SPS PDSCH HARQ-ACK feedback, arrange the HARQ-ACK information of the original downlink slot and the HARQ-ACK information of the delayed downlink slot in an ascending order of downlink slots with {SPS configuration index, serving cell index}, then arrange the HARQ-ACK information in an ascending order of the SPS configuration index in each serving cell index, and finally arrange the HARQ-ACK information in an ascending order of the serving cell index, to generate an SPS PDSCH HARQ-ACK codebook.

12. The electronic device according to claim 10, wherein the processor is further caused to:

generate the semi-static HARQ-ACK codebook by disposing in sequence the HARQ-ACK information of the delayed downlink slot of each serving cell after the HARQ-ACK information of the original downlink slot of the serving cell; or generate the semi-static HARQ-ACK codebook by disposing the HARQ-ACK information of the delayed downlink slot of all serving cells behind the HARQ-ACK information of the original downlink slot of all the serving cells and arranging the HARQ-ACK information according to cell index.

13. The electronic device according to claim 10, wherein the processor is further caused to:

arrange the HARQ-ACK information of the delayed downlink slot in an ascending order of downlink slots with {SPS configuration index, serving cell index}, then arrange the HARQ-ACK information in an ascending order of the SPS configuration index in each serving cell index, and finally arrange the HARQ-ACK information in an ascending order of the serving cell index, to generate the second codebook.

14. The electronic device according to claim 10, wherein the processor is further caused to:

acquire a first configuration parameter configured by a high layer, wherein the first configuration parameter indicates a maximum allowed delayed feedback slot offset of SPS PDSCH HARQ-ACK; and traverse SPS PDSCHs configured in serving cells, and determine the delayed downlink slot that requires feedback of the SPS PDSCH HARQ-ACK in each slot of the uplink channel resource based on the first configuration parameter.

15. The electronic device according to claim 14, wherein the SPS PDSCHs share the first configuration parameter; or each SPS PDSCH corresponds to own first configuration parameter.

16. The electronic device according to claim 14, wherein the processor is further caused to:

count original downlink slots that require feedback of SPS PDSCH HARQ-ACK in each slot corresponding to the uplink channel resource, and candidate delayed downlink slots that may require feedback of SPS PDSCH HARQ-ACK;

take a collection of the original downlink slots and the candidate delayed downlink slots to acquire a collection corresponding to each slot;

take each slot corresponding to the uplink channel resource as a current slot successively, determine each candidate delayed downlink slot in the collection corresponding to the current slot as a to-be-detected slot, and detect whether a difference between the original downlink slot corresponding to the to-be-detected slot and the current slot is less than or equal to the first configuration parameter corresponding to the SPS PDSCH; and in response to the difference being less than or equal to the first configuration parameter corresponding to the SPS PDSCH, determine that the candidate delayed downlink slot is the delayed downlink slot that requires feedback of SPS PDSCH HARQ-ACK in the current slot.

17. The electronic device according to claim 14, wherein the processor is further caused to:

traverse the serving cells, and determine candidate slots that require feedback of SPS PDSCH HARQ-ACK;

in response to no PUCCH resources being available for the candidate slots, determine the delayed downlink slot that requires feedback of the SPS PDSCH HARQ-ACK based on the first configuration parameter; and count the delayed downlink slot that requires feedback of the SPS PDSCH HARQ-ACK in each slot of the uplink channel resource.

* * * * *